Aug. 4, 1959     F. M. STRNISHA     2,897,701
SICKLE BAR PLIER TYPE TOOL
Filed April 9, 1956

Frank M. Strnisha
INVENTOR.

2,897,701

SICKLE BAR PLIER TYPE TOOL

Frank M. Strnisha, Hamilton, Mont.

Application April 9, 1956, Serial No. 576,943

1 Claim. (Cl. 81—5.1)

The present invention relates to new and useful improvements in tools to be used in disassembling and reassembling mowing machine sickle bars and has for its primary object to provide, in a manner as hereinafter set forth, a practical easy-to-use implement which may be readily used for both spreading the pitman arms and for firmly gripping and handling the usual ball at the other end of the cutter bar.

In carrying out the principles of the present invention, I have devised a comparatively simple pliers-type tool wherein a pair of lever units have outer end portions overlapped, crossed and pivoted together. It follows that the long portions of the units to one side of the pivot or hinge connection serve as handles. The shorter portions projecting beyond the pivot function as jaws. The juxtaposed surfaces of the units are flat and the construction permits the handles to swing past each other so that the tool can be used for either gripping or spreading requirements as the case may be.

Novelty is predicated in particular on the fact that the outer or terminal ends of the jaws have integral portions which are hereinafter referred to as T-heads. The end portions of the heads, which are at right angles to the axes of the jaws project laterally with respect to their adjacent lengthwise edge portions. In addition, the juxtaposed surfaces of the T-heads are flat and coplanar with the flat surfaces of the jaws. Then, too, the lengthwise edges of the jaws on corresponding sides of the jaws are recessed with the recesses in close proximity to the adjacent projecting ends of the T-heads in order to cooperate with said heads in seating and gripping flanges on the arms of the pitman.

Further novelty is predicated on the fact that the other lengthwise edges of the jaws are provided with relatively long clearance notches which extend from the T-heads towards but terminate short of the pivot connection whereby the respective projecting portions of the T-heads cooperate therewith so that they may be advantageously used in the manner to permit the jaws to straddle the ball joining member on the sickle bar or equivalent part driven by the cooperating pitman.

Other objects of the invention are to provide a combination tool of the aforementioned character which will be comparatively simple in construction, strong, durable, compact, of light weight, highly efficient and reliable in use and which may be manufactured at low cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1:
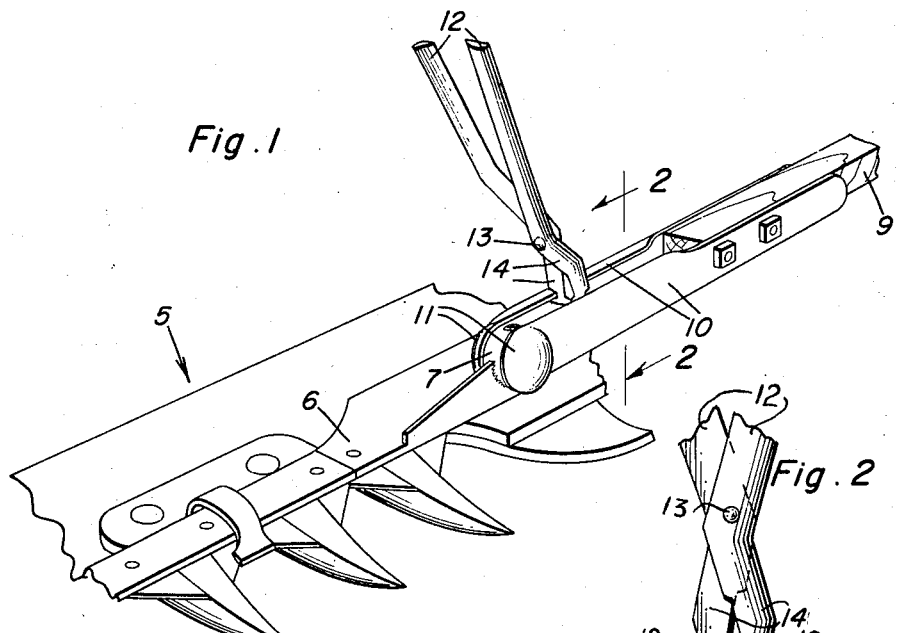
Figure 1 is a perspective view of a portion of a sickle bar, showing a tool embodying the present invention in position to spread the pitman.

Referring now to the drawing in detail, it will be seen that reference character 5 designates generally a portion of a conventional sickle bar. The sickle bar 5 includes the usual reciprocating cutter 6 having on one end thereof a ball 7 which, in the embodiment shown, is provided with diametrically opposite sockets 8. The cutter 6 is actuated by a pitman 9 comprising a pair of spaced, parallel, resilient channel bars 10 which terminate at one end in opposed cups or bearings 11 which receive and retain the ball 7 therebetween for operatively connecting said pitman to the cutter 6.

The embodiment of the present invention which has been illustrated comprises a pair of lever units having elongated handles 12 of suitable metal, which handles may be of any desired shape and dimensions. The handles 12 are substantially rounded for comfort with the exception of the inner or adjacent sides thereof, which are flat. The handles 12 are pivotally connected at one end, as indicated at 13.

Figure 3:
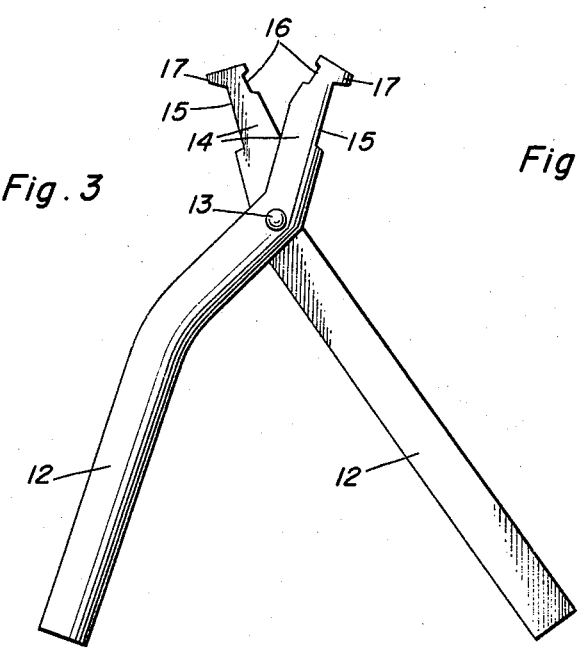
Figure 3 is a view in side elevation of the tool.
Figure 4:
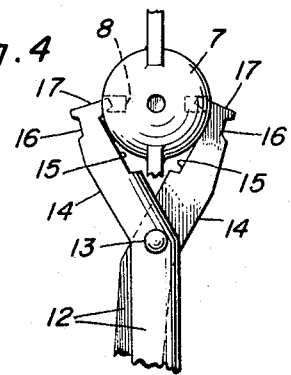
Figure 4 is an elevational view, showing the tool gripping the ball of the sickle bar.

As before briefly explained, the short portions of the lever units provide a pair of substantially duplicate jaws 14 and the opposed surfaces of these are flat and coplanar with the flat surfaces of the handle portions 12. The jaws terminate at their outer ends in simple T-heads 17. These T-heads are at right angles to the axes of the jaws and the inner heel-like ends project beyond the notched or recessed edges 16. Also, the opposite toe-like ends of the heads project laterally beyond the longer notches 15 in the edges to the left and right in Fig. 3 of the drawings.

Figure 2:
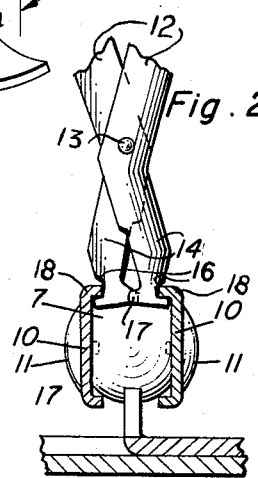
Figure 2 is a cross-sectional view, taken substantially on the line 2—2 of Figure 1.

It is thought that the use of the tool will be readily apparent from a consideration of the foregoing. Briefly, it will be noted that the construction and arrangement is such that the handles 12 and the jaws 14 thereon may be readily swung past each other for permitting either a spreading or a gripping action to be had with said jaws. To disconnect the pitman 9 from the cutter 6, the handles 12 are positioned as seen in Figure 1 of the drawing and the substantially parallel, side abutting jaws 14 are inserted downwardly between the arms 10 (see Fig. 2). The handles 12 are then swung toward each other for opening the jaws 14 and spreading the arms 10 in an obvious manner, one end portion of the T-heads or lugs 17 on said jaws engaging the inner walls of said arms the recesses or notches 16 receiving the upper flanges 18 of said arms for anchoring the tool therebetween. To grip the ball 7, the arms 12 are swung past each other for reversing the jaws 14 for the reception of said ball therebetween. The handles 12 are then swung toward each other for closing the jaws 14 on the ball, the other end portions of the T-heads or lugs 17 entering the sockets 8 for positively anchoring the tool to said ball. The construction of the jaws 14, including the recesses or notches 15 and 16, the T-heads or lugs 17, etc., is such that said jaws may be readily utilized for firmly gripping other parts or elements of the sickle bar. For instance, the usual nuts 19 of the pitman 9 may be gripped between the adjacent portions 15 and 17 of the jaws 14.

On a regular type mower the pitman is first spread with the tool operating in a spreading action, and then the ball is grasped by the tool in a clamping action with the lugs of the T-heads of the tool clamped in sockets in the ball connection on the sickle bar, and the sickle bar unit is then removed from the pitman by a straight pull. When reassembling, the ball on the sickle bar unit is grasped by the tool, and thrust back into position between the arms on the pitman.

On the highway-type mower where the pitman assembly is loosened by unbolting, the tool is introduced into the pitman assembly and clamped around the ball connection or underneath the ball, and the sickle bar is then removed from the pitman assembly by a straight push. In reassembling the highway mower the ball on the sickle bar unit is grasped in the same manner by the tool, and the sickle bar unit is put into position with the pitman unit by a straight thrust of the sickle bar ball into the pitman unit.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

For use in disassembling and reassembling a mowing machine sickle bar construction which is characterized by a pitman having channel-shaped arms the free ends of which are cupped to provide socket members for retention of a cooperating ball on a cutter bar; a hand tool of a pliers-type which is adapted for gripping and spreading the arms apart and also for gripping and clamping the ball by way of sockets provided therefor in diametrically opposite sides of the ball comprising, a pair of duplicate companion levers having outer end portions overlapped and pivoted together, said levers having relatively long portions to one side of the pivot point constituting handles, and relatively short portions on the other side of the pivot point providing a pair of jaws, the juxtaposed lengthwise surfaces of said levers being flat from end to end so that the jaws and handles may swing past each other in either desired direction, the terminal ends of said jaws having T-heads formed integrally therewith, the respective end portions of said heads projecting laterally with respect to the respective longitudinal edges of the jaws and at right angles to the axes of the jaws, the juxtaposed surfaces of said T-heads being flat and coplanar with the flat surfaces of the jaws, the lengthwise edges of the jaws on corresponding sides of the jaws being recessed, the recesses being in proximity to the adjacent projecting ends of the T-heads to cooperate with said heads in seating and gripping flanges on the arms of the pitman whereby said recesses may be engaged with said flanges and the coacting respective T-heads interposed between the channel portions of the arms in a manner to permit said arms to be spread apart for purposes of freeing the aforementioned ball, the other lengthwise edges of said jaws being provided with relatively long clearance notches extending from the T-heads toward but terminating short of the pivot connection, whereby the respective projecting portions of the T-heads cooperable therewith may be advantageously used in a manner permitting the jaws to straddle the ball and the end portions of the head to enter the sockets.

References Cited in the file of this patent

UNITED STATES PATENTS

| 159,508 | Gray | Feb. 9, 1875 |
| 892,008 | Porter | June 30, 1908 |
| 2,716,273 | Woodruff et al. | Aug. 30, 1955 |

FOREIGN PATENTS

| 447,248 | Italy | Apr. 6, 1949 |